Feb. 14, 1967    R. A. KANE    3,303,861
SAW STRUCTURE
Filed July 6, 1964
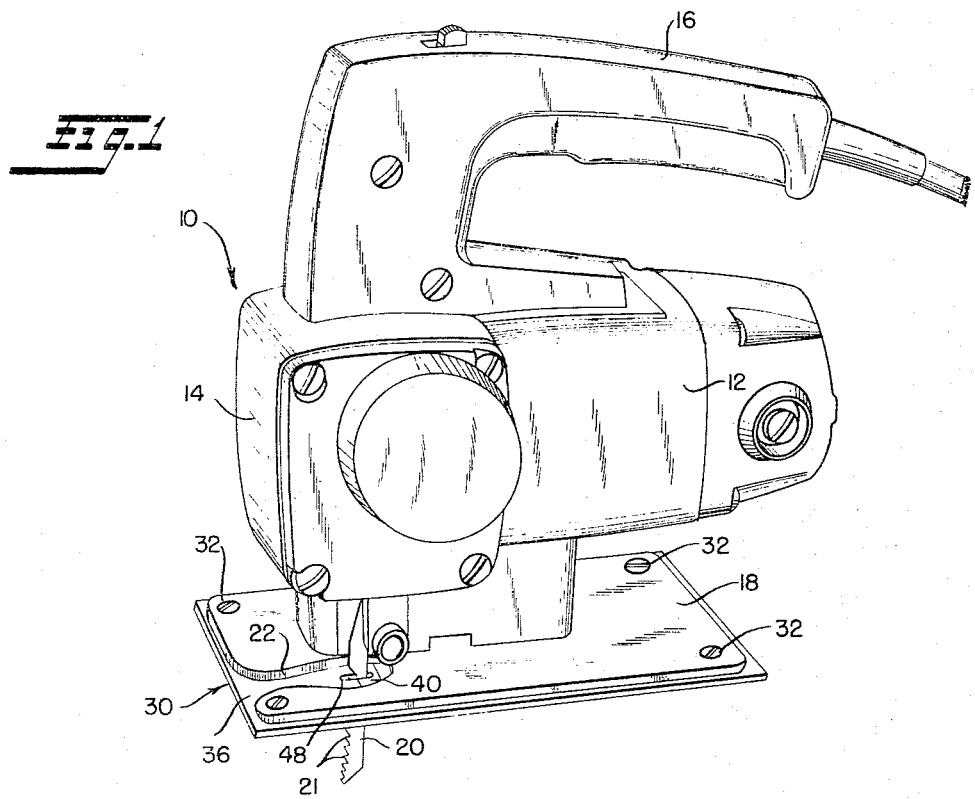
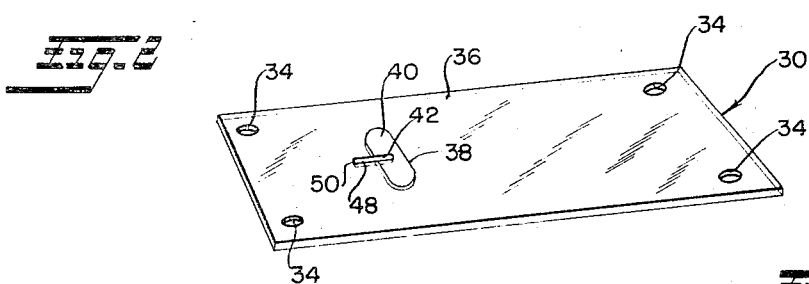
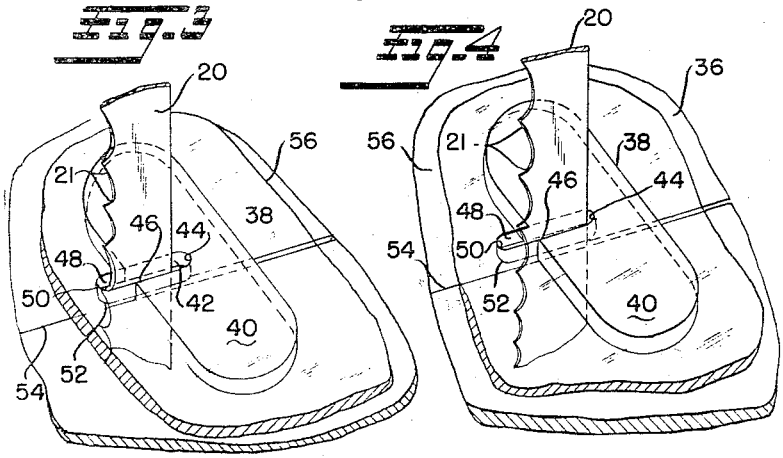
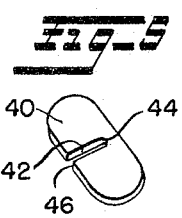
INVENTOR
ROBERT A. KANE
Strauch, Nolan & Neale
ATTORNEYS

United States Patent Office 3,303,861
Patented Feb. 14, 1967

3,303,861
SAW STRUCTURE
Robert A. Kane, Kirkville, N.Y., assignor to Rockwell Manufacturing Company, Pittsburgh, Pa., a corporation of Pennsylvania
Filed July 6, 1964, Ser. No. 380,364
11 Claims. (Cl. 143—68)

This invention relates to saber, bayonet or other types of saws having a similarly directed cutting action, and more particularly to anti-splintering base structures for such saws.

Bayonet saws conventionally include a motor, a blade actuator mechanism, and a flat workpiece-engaging base. A replaceable bayonet-like saw blade is connected to the actuator mechanism and extends perpendicularly beyond the plane of the saw base to cut a workpiece positioned adjacent thereto. In all bayonet saws, the blade actuator mechanism imparts a reciprocating motion to the blade, and in high speed bayonet saws it imparts an aggressive motion to the blade relative to the workpiece such as shown in United States Letters Patent No. 2,737,984 to Bruck. As there disclosed, an orbital reciprocation advances the blade into the workpiece on the cutting stroke and relieves the blade rearwardly away from the workpiece on the return stroke.

The teeth on bayonet blades are oriented to accomplish cutting on the blade stroke toward the saw base so as to tend to pull the saw unit and the workpiece firmly together during the cutting action. This type of cutting motion, of course, tends to pull or separate splinters and chips on the cutting stroke from the upper surface of the workpiece on both sides of the saw kerf and results in an unsightly and imperfect saw cut. This problem is particularly acute when utilizing a bayonet saw on laminated materials such as plywood or laminated plastic compositions wherein the top laminations of the material tend to layer, that is, separate from the remainder of the workpiece, during the cutting stroke.

Because of the relationship between the direction of the cutting stroke and the position of the saw and the operator in portable power driven saws, it is not possible to practice the common stationary-power-saw techniques to prevent splintering, chipping, or layering (hereinafter generically called separating). For example, scrap material placed between the workpiece and the saw base will completely support the workpiece material to prevent separation, but in portable power saws a guide line drawn on the workpiece would be covered by the scrap material, and the technique is therefore not practical.

As shown by United States Letters Patent No. 2,842,170 to Bruck et al., No. 2,996,089 to McCarty, and No. 3,045,725 to McCarty et al., prior art efforts to solve this separation problem in bayonet-type saws have involved opaque slotted inserts loosely mounted in the saw base to closely fit the two sides of the blade. Although the slot is open in front, the operator has only a limited view of a guide line, particularly on curves, because of the opaque forwardly extending, narrowly spaced side walls of the slot; this problem is particularly acute in the structure of the last two patents mentioned above. Unfortunately, such prior art inserts still permit a certain amount of separation at the upper workpiece surface which is unacceptable for high quality cabinetry and similar work where a substantially perfect cut is needed.

Accordingly, a primary object of the present invention is to provide anti-separation base structures for saws which overcome the disadvantages of prior art devices.

To accomplish this objective, the present invention provides a transparent base element adapted to be detachably mounted upon the conventional base of a bayonet saw to engage the upper surface of the workpiece. The base element is constructed so that when it is thus mounted upon a saw with a blade mounted therein, the blade protrudes through an aperture in the transparent base element so that the path of upward motion of the blade teeth is closely embraced or surrounded by the transparent element so as to fully support the workpiece material closely around the cutting area to prevent tearing or chipping of the top surface of the workpiece. Because of the transparent nature of the base element, this advantageous close support of the workpiece material is accomplished without inhibiting visibility of a guide line at the point where the teeth are cutting. The transparent base element preferably incorporates blade guide or bearing elements to prevent or minimize relative twisting or lateral motion between the blade and the base element to obviate undue wear on the transparent base material.

In one specific embodiment the transparent base element is constructed with a blade receiving slot having a closed front end to provide the above described close enclosure of the path of the blade teeth on the cutting stroke. The slot front end is preferably translucent to provide a readily visible guide mark immediately adjacent the point where the blade teeth emerge from the workpiece. The blade guide element may preferably be in the form of a metallic insert rigidly fitted in a complementary aperture in the base element adjacent the blade slot and in flush relation with the lower surface of the base element. The insert has a blade receiving guide slot open at the front edge of the insert and located so that it mates with the blade receiving slot in the transparent material of the base element to form an aligned blade receiving aperture therewith. The blade guide or bearing elements formed by the side walls of the slot in the metallic insert closely engage and guide the sides of the blade to the rear of its teeth to prevent wear on the transparent base element due to blade twisting and lateral bending.

The present invention is thus effective to prevent separation at the upper portions of the workpiece because the blade aperture in the transparent saw element closely encloses the front edge of the saw blade and thus supports the upper workpiece surface ahead of, as well as to either side of, the saw blade. At the same time, the transparency of the base element permits clear visibility, from any angle, of the exact positional relationship between the cutting edge of the blade and the workpiece guide line right at the intersection therebetween.

Accordingly, other objects of the present invention include:

(1) The provision of improved, transparent anti-separation base attachments for bayonet-type saws;

(2) The provision of improved anti-separation devices for bayonet-type saws which facilitate visibility of the saw-blade-to-guide-line alignment;

(3) The provision of improved anti-separation devices for bayonet saws having blade slots closely encompassing the front of the blade teeth to prevent lifting of portions of the workpiece thereat; and (4) The provision of transparent anti-separation base attachments for saws having bearing means to guide the saw blade and prevent wear on the transparent material of the base attachment.

These and other objects of the present invention will more fully appear from the follwoing description and appended claims when read in conjunction with the accompanying drawings, wherein:

FIGURE 1 is an over-all perspective view of a bayonet saw incorporating the novel anti-separation base attachment of the present invention;

FIGURE 2 is a perspective view of the base attachment of FIGURE 1;

FIGURE 3 is an enlarged perspective view showing the relationship between the bayonet saw blade, the transparent base attachment, and a guide line on a workpiece, during the cutting upstroke of the saw blade:

FIGURE 4 is a view similar to FIGURE 3 but shows the saw blade on a downstroke; and FIGURE 5 is a perspective view of a blade guiding element of the base attachment of FIGURE 2.

As shown generally in FIGURE 1, a bayonet saw 10 has a motor 12, a blade actuating mechanism 14, a handle 16, a base 18, and a removable blade 20 having teeth 21; blade 20 protrudes through an opening 22 in base 18. An anti-separation base attachment 30 in the illustrated embodiment of the present invention is mounted on the bottom of base 18 by nut and bolt assemblies 32 passing through bores 34 suitably provided in base attachment 30.

As shown in detail in FIGURES 2 to 5, attachment 30 may include a plate 36 formed from any suitable scratch resistant, rigid, transparent sheet material, preferably plastic, and may be, for example, an acrylic resin such as methyl methacrylate, commonly known at "Lucite." An insert receiving aperture 38 is cut through plate 36 and a metallic insert 40 is secured rigidly therein, preferably positioned so that its bottom surface is substantially flush with the bottom surface of plate 36. Insert 40 has a blade receiving slot 42 formed therein having a closed rear end 44 and an open front end 46 at the front edge of the insert. There is a further slot 48 in transparent plate 36 forming an aligned continuation of insert slot 42 when the insert is mounted in the plate. Slot 48 has a translucent closed forward end 50 which closely encloses or encompasses the forward cutting edges of teeth 21 of the blade during at least the cutting stroke as shown in FIGURE 3. The translucent forward end of slot 48, which forms a readily visible guide mark, intersects the bottom, workpiece-engaging surface of plate 36 in an edge 52.

In operation, blade 20 in its cutting stroke urges the workpiece firmly against the lower surface of transparent plate 36. The material at the forward end 50 of blade slot 48 is effective to firmly hold down, and thereby prevent splintering and separation of the upper portions of the workpiece that would otherwise occur if the workpiece material directly in front of the blade were unsupported and could lift with the blade on the cutting upstroke. Further, as is apparent from FIGURES 3 and 4, a guide line 54 on the workpiece 56 and the lower edge 52 of the translucent front end 50 of slot 48 are both readily visible through the transparent plate. Since the exact point on the workpiece where the leading tips of the blade teeth are cutting is immediately to the rear of intersection edge 52, the blade-to-workpiece relation can be accurately controlled. Further, because the intersection edge 52 and the workpiece guide line 54 are in immediate adjacency, no error due to parallax occurs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a portable power operated saw having a blade with teeth adapted to cut through a workpiece in a direction toward the operator-visible side of the workpiece, transparent means closely encompassing the path of said saw teeth at the point where they emerge from the workpiece during the cutting action to prevent separation of portions of the workpiece along the saw kerf, said transparent means including a blade slot, the front end of which is closed and is in closely fitted relation with the front of the blade teeth at least during the cutting strokes of the blade and the front end of said blade slot is translucent to define a readily visible guide mark for the saw blade.

2. In a portable power operated saw having a blade with teeth adapted to cut through a workpiece in a direction toward the operator-visible side of the workpiece, transparent means closely encompassing the path of said saw teeth at the point where they emerge from the workpiece during the cutting action to prevent separation of portions of the workpiece along the saw kerf, said transparent means including a blade slot, the front end of which is closed and is in closely fitted relation with the front of the blade teeth at least during the cutting strokes of the blade and with blade guide means adapted to minimize blade wear on said slot.

3. A combination as defined in claim 2 wherein said guide means are connected to said transparent means and have bearing surfaces in sliding contact with the sides of said blade rearwardly of said teeth to minimize relative twisting and lateral motion between said blade and said transparent means.

4. An anti-separation base attachment for bayonet saws comprising a transparent member, mounting means adapted to mount said member on a bayonet saw base, means defining a blade passage through said transparent member adapted to closely encompass the front and sides of the path of the bayonet saw teeth at the workpiece surface during the cutting action to fully support the upper surface of a workpiece to prevent lifting of portions thereof, and blade guide means connected to said transparent member adjacent said passage defining means and adapted to prevent relative lateral motion and twisting between the bayonet saw blade and said transparent member.

5. An attachment as defined in claim 4 wherein said passage defining means includes means forming a closed passage side to the rear of the path of the blade.

6. An attachment as defined in claim 4 wherein the portion of said passage defining means adapted to closely encompass the path of the front of the saw teeth is translucent to define a readily visible saw guide mark.

7. An attachment as defined in claim 4 wherein said transparent member is formed of a plastic material.

8. An attachment as defined in claim 7 wherein said plastic material is an acrylic resin.

9. An attachment as defined in claim 7 wherein said plastic material is methyl methacrylate.

10. An attachment as defined in claim 7 wherein said blade guide means comprise a bearing material mounted in said plastic material.

11. An attachment as defined in claim 10 wherein said passage defining means is a blade receiving slot having a closed forward end portion defined by said transparent plastic material in alignment with a rear end portion defined by said bearing material.

References Cited by the Examiner

UNITED STATES PATENTS

| | | | |
|---|---|---|---|
| 1,934,190 | 11/1933 | Harker. | |
| 2,424,748 | 7/1947 | Gilbert | 30—275 |
| 2,469,277 | 5/1949 | Schmidt | 143—68 X |
| 2,946,358 | 7/1960 | Bruck | 143—68 |
| 2,961,016 | 11/1960 | Papworth | 143—68 |

DONALD R. SCHRAN, *Primary Examiner.*